United States Patent
Nakamura et al.

[11] Patent Number: 6,067,868
[45] Date of Patent: May 30, 2000

[54] ANTI-ROTATION MECHANISM IN A SCREW TYPE LINEAR ACTUATOR

[75] Inventors: Kenichiro Nakamura, Shiga-Ken; Toshio Mitsuyama, Osaka-fu; Takashi Noguchi, Kyoto, all of Japan

[73] Assignee: Tsubakimoto Chain Co., Osaka, Japan

[21] Appl. No.: 08/813,763

[22] Filed: Mar. 7, 1997

[30] Foreign Application Priority Data

Mar. 7, 1996 [JP] Japan ................... 8-050164

[51] Int. Cl.⁷ .................................................. F16H 25/20
[52] U.S. Cl. ................................ 74/89.15; 74/424.8 R
[58] Field of Search ................. 74/424.8 R, 89.15; 403/383, 375; 464/162, 172

[56] References Cited

U.S. PATENT DOCUMENTS

| | | | |
|---|---|---|---|
| 3,545,299 | 12/1970 | Scherenberg | 74/492 |
| 3,873,066 | 3/1975 | Opyrchal | 74/89.15 |
| 4,137,784 | 2/1979 | Griffin | 74/89.15 |
| 4,473,335 | 9/1984 | Henry | 416/20 A |
| 4,614,128 | 9/1986 | Fickler | 74/89.15 X |
| 4,679,451 | 7/1987 | Nakamura . | |
| 5,154,433 | 10/1992 | Naruse | 277/235 R |
| 5,178,411 | 1/1993 | Fevre et al. | 74/89.15 X |
| 5,267,480 | 12/1993 | Krizan | 74/493 |
| 5,596,903 | 1/1997 | Parker | 74/89.15 |

FOREIGN PATENT DOCUMENTS 506007 11/1995 Japan .

*Primary Examiner*—David A. Bucci
*Assistant Examiner*—William C Joyce
*Attorney, Agent, or Firm*—Dann, Dorfman, Herrell and Skillman; Henry H. Skillman

[57] ABSTRACT

An anti-rotation mechanism in a linear actuator has outer and inner cylinders, affords high accuracy and rigidity, is simple in structure, not requiring the use of a tie rod, and is inexpensive to manufacture. The outer cylinder 3 has both end portions 3 of circular cross section and an intermediate portion whose inner surface has an axially uniform non-circular cross-sectional shape including a rotation inhibiting surface 3F. The inner cylinder 4 has a collar 7 on the outer peripheral surface which is guided and supported slidably by the intermediate portion of the outer cylinder and has a conforming non-circular cross-sectional shape including a flat surface 7B for sliding engagement with the rotation inhibiting surface 3F to inhibit rotation of the inner cylinder.

11 Claims, 3 Drawing Sheets

ANTI-ROTATION MECHANISM IN A SCREW TYPE LINEAR ACTUATOR

FIELD OF THE INVENTION

The present invention relates to a mechanism for preventing rotation of an inner cylinder in a screw type linear actuator wherein the inner cylinder is disposed for projection and retraction within an outer cylinder.

BACKGROUND OF THE INVENTION

One conventional screw type linear actuator, is shown in FIG. 3. The illustrated actuator is provided with a hollow inner cylinder 22 which is guided slidably within an outer cylinder 21. A nut 23, which is fixed on the base end side of the inner cylinder 22, is in threaded engagement with a screw shaft 24 which is disposed coaxially within the inner cylinder 22. In the peripheral portion of the nut 23 is formed a guide hole 23A for passing therethrough of a tie rod 25, the tie rod 25 being mounted axially within the outer cylinder 21.

When the screw shaft 24 is driven rotatively by means of a motor 26 through a reduction mechanism 27, the nut 23 engaged threadedly with the screw shaft 24 moves axially of the screw shaft because its rotation is prevented by the tie rod 25, so that the inner cylinder 22 moves forward or backward relative to the outer cylinder 21.

Another structure is disclosed in Japanese Utility Model Publication No. 50600/95. In this structure, an outer cylinder is formed using a square pipe, and tie rods are disposed at the four corners in the interior of the square pipe. Further, the outer surface of a nut engaged threadedly with a screw shaft is formed in a square shape in conformity with the inner surface of the outer cylinder. In the four corners of the nut are formed cutout portions for engagement with the tie rod.

In the screw-type linear actuator of the structure shown in FIG. 3, however, the tie rod 25 is apt to deflect or oscillate due to a rotational torque acting on the nut 23 from the screw shaft 24, so that when the stroke of the inner cylinder 22 is long, it becomes difficult for the inner cylinder 22 to perform a smooth advancing and retreating motion.

According to the structure disclosed in the foregoing Japanese Utility Model Publication 50600/95, the torque acting on the nut with rotation of the screw shaft is borne by not only the tie rod but also the inner wall surfaces of the outer cylinder to diminish deflection of the tie rod. However, since the outer cylinder has a square section, it is necessary that the inner cylinder bearing portion on the front end side of the outer cylinder and the socket portion on the body side which fixes the base end portion of the outer cylinder be formed in a square sectional shape conforming to that of the outer cylinder. For enhancing both accuracy and sealability, such a requirement gives rise to a problem in machining and also to a structural difficulty. An increase of production cost also results.

SUMMARY OF THE INVENTION

Accordingly, it is an object of the present invention to solve the above-mentioned problems of the prior art and provide an anti-rotation mechanism in a screw type linear actuator which mechanism permits not only the attainment of both high accuracy and high rigidity but also the attainment of a simple structure dispensing with the use of a tie rod and reduction of manufacturing cost.

According to the present invention, in order to achieve the above-mentioned object, there is provided an anti-rotation mechanism in a screw type linear actuator, comprising an outer cylinder having a circular cross section at both end portions thereof, having an intermediate portion whose inner surface has an axially uniform cross-sectional shape, and further having a flat rotation inhibiting surface formed as at least a part of the inner surface of the said intermediate portion; and an inner cylinder collar provided on the outer peripheral surface of an inner cylinder which is driven for projection and retraction with respect to the outer cylinder, the inner cylinder collar having a flat surface adapted to be abutted with the said rotation inhibiting surface and thereby prevented from rotation, the said inner cylinder collar being guided and supported slidably by the inner surface of the intermediate portion of the outer cylinder. Preferably, a surface treatment for enhancing abrasion resistance and lubricity is applied to the surface of the said inner cylinder collar which surface is to slide on the inner surface of the outer cylinder.

As the inner cylinder collar provided on the outer peripheral surface of the inner cylinder slides on the inner surface of the intermediate portion of the outer cylinder, the protruding and retracting motion of the inner cylinder relative to the outer cylinder is guided. At this time, in the screw type linear actuator, a torque is exerted on the inner cylinder and tries to cause the inner cylinder to rotate about its axis, but the rotation of the inner cylinder collar fixed to the inner cylinder is inhibited by both the flat rotation inhibiting surface formed as part of the inner surface of the outer cylinder and the flat surface formed as part of the inner cylinder collar.

In the case where a surface treatment for enhancing abrasion resistance and lubricity is applied to the surface of the inner cylinder collar which slides on the inner surface of the outer cylinder, friction and wear are diminished during sliding contact of the inner cylinder collar with the inner surface of the outer cylinder as the inner cylinder is advanced and retracted.

BRIEF DESCRIPTION OF THE DRAWINGS

All of the objects of the present invention are more fully set forth hereinafter with reference to the accompanying drawings, wherein.

DESCRIPTION OF A PREFERRED EMBODIMENT

Figure 1:
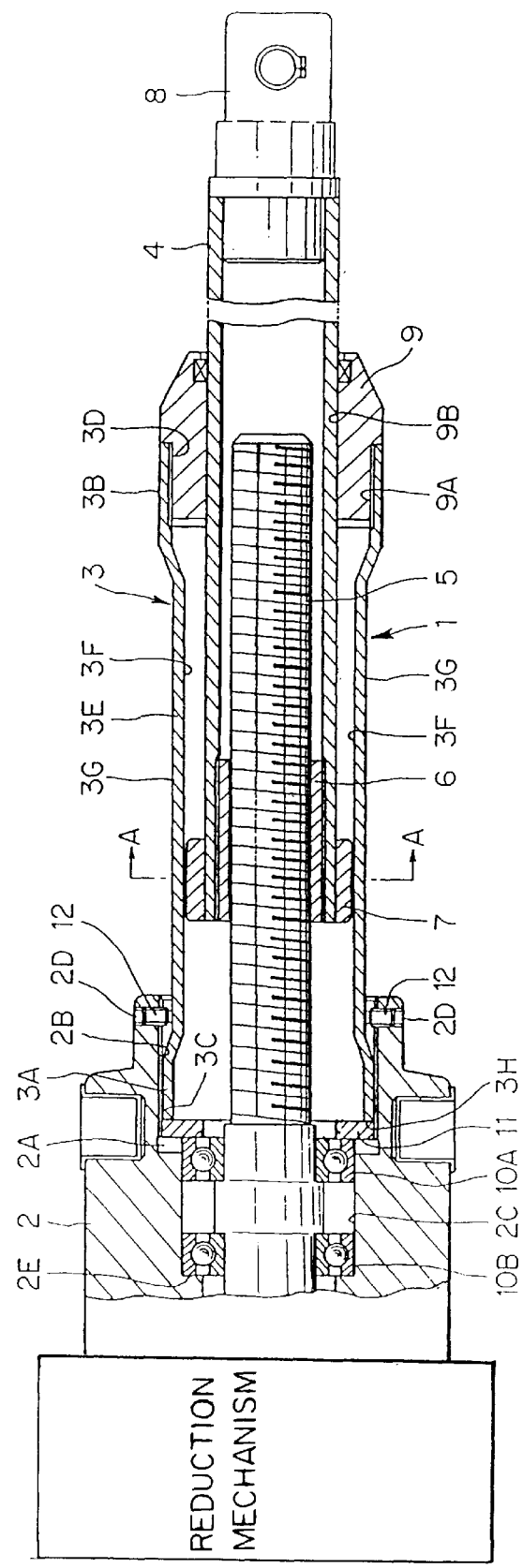
FIG. 1 is a longitudinal sectional view of a principal portion of an anti-rotation mechanism in a screw type linear actuator according to a preferred embodiment of the present invention.

An embodiment of the present invention will now be described with reference to the drawings. FIG. 1 is a sectional view of a principal portion of a screw type linear actuator equipped with an anti-rotation mechanism embodying the present invention. The linear actuator, indicated at 1, is provided with an outer cylinder 3 fixed to a body 2, an inner cylinder 4 supported in a retractably projectable manner relative to the outer cylinder 3, and a screw shaft 5 for driving the inner cylinder 4 so as to cause projection and retraction of the inner cylinder. The body 2 is part of the housing of a reduction mechanism which is connected to a motor (not shown) to drive the screw shaft 5. The screw shaft 5 is in threaded engagement with a nut 6 fitted and anchored in the inner peripheral surface of the base end portion of the inner cylinder 4.

Onto the outer peripheral surface of the base end portion of the inner cylinder 4 is fixed an inner cylinder collar 7 which is guided slidably on the inner surface of an intermediate portion of the outer cylinder 3. To the front end of the inner cylinder 4 is fixed a tip member, such as a clevis 8. The tip member 8 is to be connected to a member of a mechanical device (not shown) which is to be operated, and causes the mechanical device to perform a desired operation with projection and retraction of the inner cylinder 4.

On the other hand, a base end portion 3A and a front end portion 3B of the outer cylinder 3 have a circular cross section which is concentric with the screw shaft 5. External threads 3C formed on the outer peripheral surface of the base end portion 3A are brought into threaded engagement with internal threads 2B formed in the inner surface of an outer cylinder mounting hole 2A of the body 2, whereby the outer cylinder 3 is connected and fixed to the body 2.

Further, internal threads 3D are formed in the inner peripheral surface of the front end portion 3B of the outer cylinder 3, and external threads 9A formed on the outer peripheral surface of a cylinder bearing portion 9 are brought into engagement with the internal threads 3D to fix the cylinder bearing portion 9 to the outer cylinder 3. Centrally of the cylinder bearing portion 9 is formed an inner cylinder guide hole 9B to slidably guide and support the inner cylinder 4.

Figure 2:
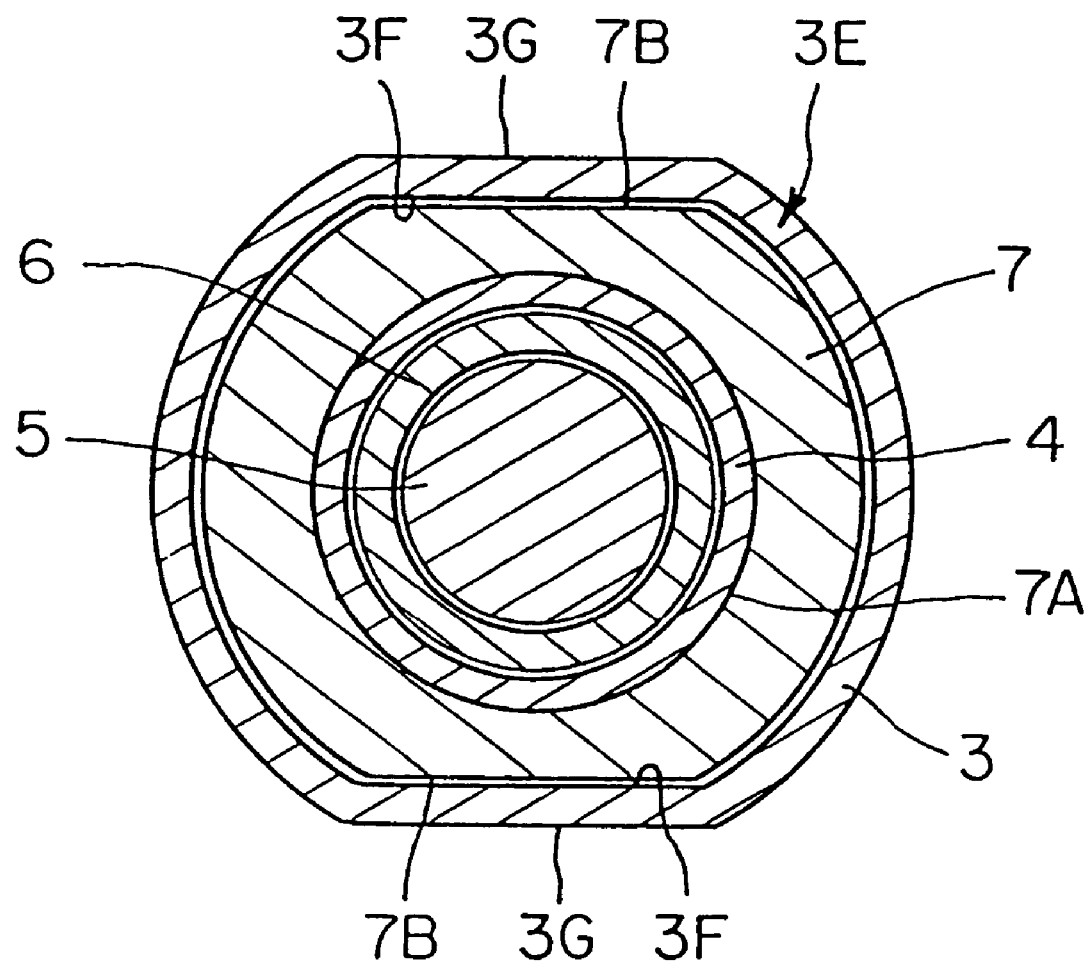
FIG. 2 is a cross-sectional view taken on line A—A in FIG. 1.
Figure 3:
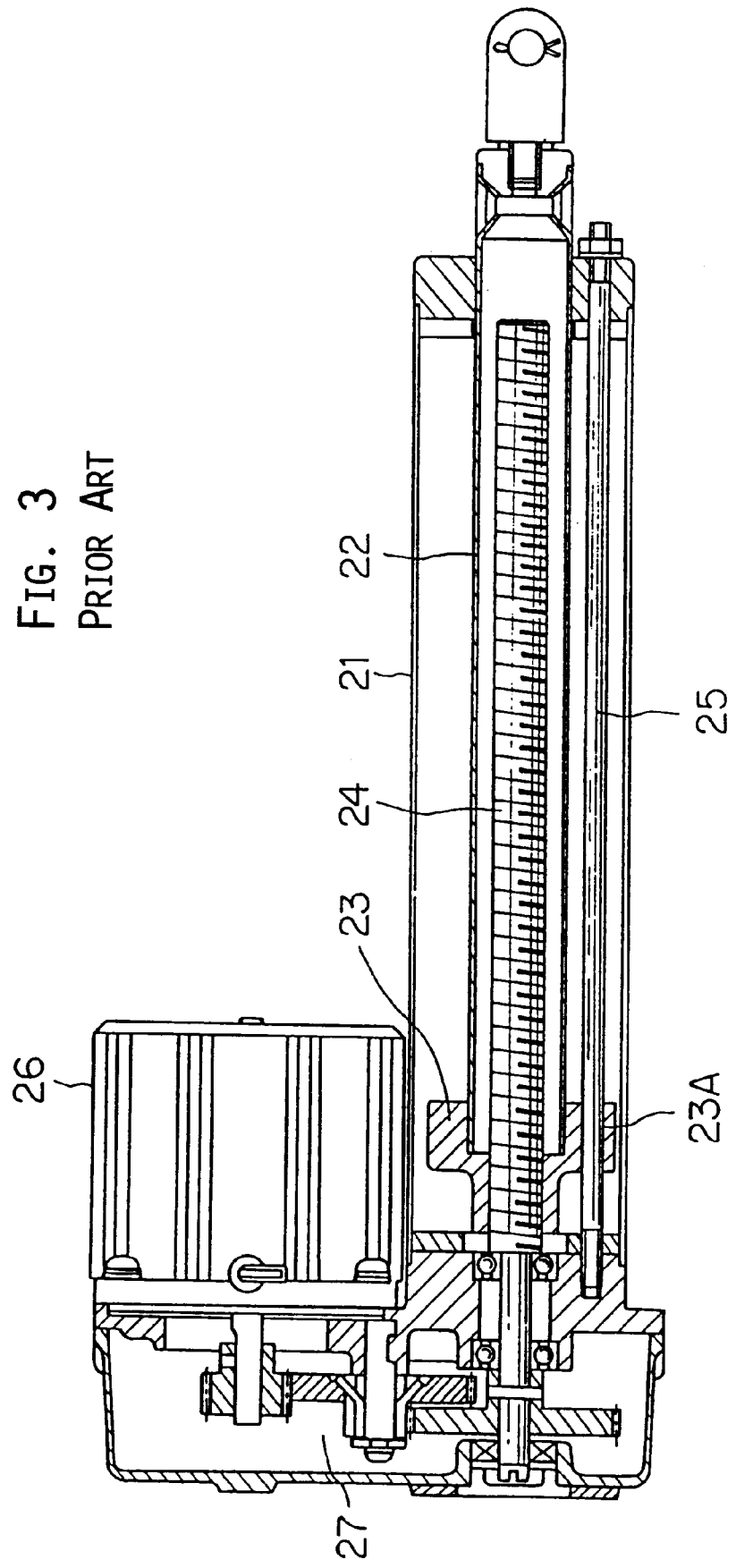
FIG. 3 is a longitudinal sectional view showing an example of a conventional anti-rotation mechanism in a screw type linear actuator.

FIG. 2 is a cross-sectional view taken on line A—A in FIG. 1. An intermediate portion 3E of the outer cylinder 3 has an axially uniform cross-sectional shape and is internally provided with a pair of flat rotation inhibiting surfaces 3F which are parallel to the axis of the cylinder 3 and the screw shaft 5, and opposed to each other. Both side portions which connect the paired rotation inhibiting surfaces 3F with each other are formed by two arcuate surfaces concentric with the screw shaft 5, the arcuate surfaces having the same radius.

In this embodiment, flat surfaces 3G are formed outside the paired rotation inhibiting surfaces 3F of the intermediate portion 3E of the outer cylinder 3 and in positions correspondingly to each other. As shown in FIG. 1, base end-side portions of the flat surfaces 3G fit into the outer cylinder mounting hole 2A of the body 2 and are tightened with set-screws 12 which are threadedly fitted in a pair of tapped holes 2D formed oppositely in the diametrical direction of the outer cylinder mounting hole 2A. The set-screws 12 function to prevent loosening of the threaded engagement between the external threads 3C of the outer cylinder 3 and the internal threads 2B of the body 2.

The inner cylinder collar 7 is centrally formed with a mounting hole 7A, which is fixed to the inner cylinder 4 by welding or by threaded engagement. In the case of adopting threaded engagement, external threads are formed on the outer peripheral surface of the base end portion of the inner cylinder 4, while internal threads for engagement with the said external threads are formed in the inner peripheral surface of the mounting hole 7A, and the rotation of the inner cylinder collar 7 relative to the inner cylinder 4 is prevented using a key or the like. The outer periphery of the collar 7 has a contour shape conforming to the cross-sectional shape of the inner surface of the intermediate portion 3E of the outer cylinder 3. That is, the collar outer periphery has a pair of parallel flat surfaces 7B for abutment with the paired rotation inhibiting surfaces 3F of the outer cylinder 3. Both side portions located between the paired flat surfaces 7B are formed by arcuate surfaces concentric with the mounting hole 7A so as to match the cross-sectional shape of the inner surface of the intermediate portion 3E of the outer cylinder 3.

As shown in FIG. 1, the screw shaft 5 is supported rotatably by two bearings 10A and 10B which are fitted in a bearing support hole 2C formed in the body 2 of the speed reduction mechanism coaxially with the outer cylinder mounting hole 2A. One bearing 10A is pressed by a washer 11 which is disposed within the outer cylinder mounting hole 2A in abutment with an end face 3H on the base end side of the outer cylinder 3, while the other bearing 10B is inhibited its axial movement by a stepped portion 2E of the bearing support hole 2C.

In the above construction, when the screw shaft 5 is driven rotatively through the speed reduction mechanism by an electric motor (not shown), the nut 6, together with the inner cylinder 4, is moved in its projecting or retracting direction relative to the outer cylinder 3, thereby causing a mechanical device (not shown) connected to the tip member 8 of the inner cylinder 4 to perform a desired operation. At this time, the paired flat surfaces 7B formed on the outer periphery of the inner cylinder collar 7 which is provided on the outer peripheral surface of the base end portion of the inner cylinder 4, come into abutment against the rotation inhibiting surfaces 3F formed inside the outer cylinder 3, whereby the rotation of the collar 7 is inhibited. In this state the collar 7 is guided and slides along the inner surface of the intermediate portion 3E of the outer cylinder 3.

Particularly in this embodiment, since the rotation of the inner cylinder collar 7 is inhibited by the paired, flat rotation inhibiting surfaces 3F formed axially in parallel and opposedly to each other in the intermediate portion 3E of the outer cylinder 3, not only the manufacture of the outer cylinder 3 is easy but also the spacing between the paired rotation inhibiting surfaces 3F opposed to each other can be rendered more accurate and hence the inner cylinder collar 7 can be guided smoothly and with a high accuracy by the outer cylinder 3.

It is desirable that a surface treatment for enhancing abrasion resistance and lubricity be applied to the outer surface of the inner cylinder collar 7 which surface comes into sliding contact with the inner surface of the outer cylinder 3. For the said surface treatment there may be adopted, for example, hard chromium plating, fusion-bonding of molybdenum disulfide, or coating of a fluorine-contained resin.

Although in the above embodiment a pair of axially parallel, opposed, flat rotation inhibiting surfaces 3F are formed inside the intermediate portion 3E of the outer cylinder 3 and the inner cylinder collar 7 is formed with a pair of flat surfaces 7B correspondingly to the paired rotation inhibiting surfaces 3F, no limitation is made to this structure. It suffices for a rotation-inhibiting non-circular surface to be formed at least partially on the inner surface of the intermediate portion of the outer cylinder and for a conforming non-circular surface to be formed partially on the outer peripheral surface of the inner cylinder collar. The conforming non-circular surfaces avoid presenting surfaces of revolution about the longitudinal axis of the screw shaft 5. There also may be adopted a structure wherein the intermediate portion of the outer cylinder is formed to have a polygonal section such as a square or hexagonal section, the inner surface of the intermediate portion is formed by only flat rotation inhibiting surfaces, and the inner cylinder collar is also formed to have a corresponding polygonal contour such as a square or hexagonal contour. Further, although in the above embodiment the inner cylinder collar 7 and the nut 6 are fixed as separate components to the inner cylinder 4, internal threads may be formed centrally of the inner cylinder collar for direct engagement with the screw shaft and the nut may be rendered integral with the collar.

In the anti-rotation mechanism in a screw type linear actuator according to the present invention, as set forth, since both end portions of the outer cylinder are circular in cross section, the connection of the outer cylinder at the base end portion thereof with the body of the linear actuator and the connection of the outer cylinder at the front end portion thereof with the inner cylinder bearing portion can be formed as positive and strong connections by threaded engagement. Consequently, it is no longer necessary to use a tie rod, thus permitting reduction of the manufacturing cost.

Moreover, by combination of the outer cylinder having an intermediate portion whose inner surface has an axially uniform cross-sectional shape and has a flat rotation inhibiting surface at least partially, with the inner cylinder collar provided on the inner peripheral surface of the inner cylinder which is driven for projection and retraction relative to the outer cylinder, the inner cylinder having a flat surface for abutment with the said rotation inhibiting surface to inhibit rotation of the inner cylinder collar, it is possible to effect the projecting and retracting motion of the inner cylinder relative to the outer cylinder smoothly and with high accuracy and further possible to positively prevent rotation of the inner cylinder with respect to the outer cylinder.

Additionally, in the case where a surface treatment for enhancing abrasion resistance and lubricity is applied to the surface of the inner cylinder collar which surface is to slide on the inner surface of the outer cylinder, it is possible to reduce wear and friction during sliding contact of the inner cylinder collar with the inner surface of the outer cylinder and hence possible to keep the projecting and retracting motion of the inner cylinder highly accurate over a long period.

While a particular embodiment of the invention has been herein illustrated and described, it is not intended to limit the invention to such disclosures, but changes and modifications may be made therein and thereto within the scope of the following claims.

We claim:

1. An anti-rotation mechanism in a screw linear actuator, comprising:

an outer hollow cylinder having an axial length and portions of a circular cross section at both ends of said axial length, and having an intermediate portion comprising an inner surface with a cross-sectional shape which is uniform along said axial length and an outer surface, said inner surface of the hollow cylinder having at least two axial edges with a flat rotation-inhibiting surface therebetween parallel to the longitudinal axis of said hollow cylinder, formed as at least a part of said inner surface, and at least one arcuate surface meeting said at least two axial edges;

said outer surface of the hollow cylinder having circular end portions, and at least two axial edges with a flat outer surface therebetween parallel to the longitudinal axis of said hollow cylinder, formed as at least a part of said outer surface, and at least one arcuate surface meeting said at least two axial edges;

an inner cylinder having an inner cylinder outer peripheral surface, and an inner cylinder collar provided on said inner cylinder outer peripheral surface which is slidably mounted within said outer cylinder for axial advancement and retraction with respect to said outer cylinder, said inner cylinder collar comprising an outer collar surface having at least two axial edges with a flat surface therebetween in a position to be abutted with said flat rotation inhibiting surface of said inner surface, and at least one arcuate surface meeting the axial edges of said collar outer surface, said collar thereby being prevented from rotation, the flat surface of the outer surface of said inner cylinder collar being guided and supported slidably by the flat surface of the inner surface of said intermediate portion of the outer cylinder; and a casing with a hole having a interior bore telescopically receiving the circular end portions of the outer cylinder, and a set screw penetrating said bore to engage said flat outer surface of the outer hollow cylinder.

2. An anti-rotation mechanism in a screw linear actuator according to claim 1, wherein said outer flat collar surface is adapted to mate with and slide on the inner surface of the outer cylinder, at least one of said flat mating surfaces having a surface treatment for enhancing abrasion resistance and lubricity.

3. An anti-rotation mechanism in a screw linear actuator according to claim 1, wherein each of said hollow cylinder inner surface and said hollow cylinder outer surface and said outer collar surface comprising four axial edges with two flat surfaces therebetween, said two flat surfaces being positioned diametrically opposite to each other on each of said surfaces, said arcuate surfaces meeting the axial edges of and joining the diametrically opposite flat surfaces.

4. An anti-rotation mechanism in a screw linear actuator, comprising:

an outer hollow cylinder having an axial length and end portions with a circular cross section at both ends thereof, and having an intermediate portion comprising an inner surface with a non-circular cross-sectional shape which is uniform along said axial length, and an outer surface, said inner surface of the hollow cylinder having at least two axial edges with a flat rotation-inhibiting surface therebetween parallel to the longitudinal axis of said hollow cylinder, formed as at least a part of said inner surface, and at least one arcuate surface meeting said at least two axial edges;

said outer surface of the hollow cylinder having circular end portions, and at least two axial edges with a flat outer surface therebetween parallel to the longitudinal axis of said hollow cylinder, formed as at least a part of said outer surface, and at least one arcuate surface meeting said at least two axial edges;

an inner cylinder collar slidably mounted within said outer hollow cylinder for advancement and retraction with respect to said outer cylinder, said inner cylinder collar comprising an outer surface having a non-circular cross-sectional shape conforming to the non-circular cross-sectional shape of the inner surface of said intermediate portion, said inner cylinder collar outer surface having at least two axial edges with a flat surface therebetween in a position to be abutted with said flat rotation-inhibiting surface of said inner surface, and at least one arcuate surface meeting the axial edges of said collar outer surface, said collar thereby being prevented from rotation about the axis of the outer cylinder, the flat surface of the outer surface of said inner cylinder collar being guided and supported slidably by the flat surface of the inner surface of said intermediate portion of the outer cylinder; and a casing with a hole having a interior bore telescopically receiving the circular end portions of the outer cylinder, and a set screw penetrating said bore to engage said flat outer surface of the outer cylinder.

5. An anti-rotation mechanism in a screw linear actuator according to claim 4, wherein each of said inner surface, said collar outer surface, and said outer peripheral surface of the hollow cylinder has four axial edges with two flat surfaces therebetween, said two flat surfaces being positioned diametrically opposite to each other, said arcuate surfaces meeting the axial edges of and joining the diametrically opposite flat surfaces.

6. An anti-rotation mechanism in a screw linear actuator according to claim 4, wherein said outer flat collar surface is adapted to mate with and slide on the inner surface of the hollow cylinder, at least one of said flat mating surfaces having a surface treatment for enhancing abrasion resistance and lubricity.

7. A screw linear actuator having an anti-rotation mechanism, comprising:

an inner cylinder having an axial screw shaft threadedly engaged therein to effect axial advancement and retraction of the inner cylinder upon rotation of said screw shaft;

an outer hollow cylinder having an axial length and end portions with a circular cross section at both ends thereof, and having an intermediate portion comprising an inner surface with a non-circular cross-sectional shape which is uniform along said axial length, and an outer surface, said inner surface of the hollow cylinder having at least two axial edges with a flat rotation-inhibiting surface therebetween parallel to the longitudinal axis of said hollow cylinder, formed as at least a part of said inner surface, and at least one arcuate surface meeting said at least two axial edges;

said outer surface of the hollow cylinder having threaded circular end portions, and at least two axial edges with a flat outer surface therebetween parallel to the longitudinal axis of said hollow cylinder, formed as at least a part of said outer surface, and at least one arcuate surface meeting said at least two axial edges;

an inner cylinder collar fixed to said inner cylinder and slidably mounted within said outer cylinder for advancement and retraction with respect to said outer cylinder, said inner cylinder collar comprising an outer collar surface having a non-circular cross-sectional shape conforming to the non-circular cross-sectional shape of the inner surface of said hollow cylinder intermediate portion, said inner cylinder collar outer surface having at least two axial edges with a flat surface therebetween in a position to be abutted with said flat rotation inhibiting surface of said inner surface, and at least one arcuate surface meeting the axial edges of said collar outer surface, said collar thereby being prevented from rotation about the axis of the outer cylinder upon rotation of said axial screw shaft, the flat surface of the outer surface of said inner cylinder collar being guided and supported slidably by the flat surface of the inner surface of said intermediate portion of the outer hollow cylinder; and a casing with a hole having a threaded interior bore telescopically receiving the threaded circular end portions of the outer cylinder, and a set screw penetrating said bore to engage the flat outer surface of the hollow cylinder.

8. A linear actuator according to claim 7, comprising a reduction mechanism adapted to rotate said axial screw shaft from a motor, and a nut carried by said screw shaft and fixed to said inner cylinder to be advanced and retracted by rotation of said screw shaft.

9. A linear actuator according to claim 8, wherein said reduction mechanism has a casing, said outer hollow cylinder being fixed to said casing whereby upon rotation of said screw shaft said nut effects advancement and retraction of said inner cylinder away from and toward said casing.

10. A screw linear actuator according to claim 7, wherein each of said inner surface, said collar outer surface, and said outer peripheral surface of the hollow cylinder has four axial edges with two flat surfaces therebetween, said two flat surfaces being positioned diametrically opposite to each other, said arcuate surfaces meeting the axial edges of and joining the diametrically opposite flat surfaces.

11. An anti-rotation mechanism in a screw linear actuator according to claim 7, wherein said outer flat collar surface is adapted to mate with and slide on the inner surface of the hollow cylinder, at least one of said flat mating surfaces having a surface treatment for enhancing abrasion resistance and lubricity.

* * * * *